(12) United States Patent
Salmia et al.

(10) Patent No.: US 11,401,971 B2
(45) Date of Patent: Aug. 2, 2022

(54) LOW-COST MODULAR INDUCTIVE POSITION SENSOR AND METHOD OF MANUFACTURING IT

(71) Applicant: INGERSOLL-RAND INDUSTRIAL U.S., INC., Davidson, NC (US)

(72) Inventors: Lauri Juhani Salmia, Espoo (FI); Petri J Mäki-Ontto, Espoo (FI); Esa H. M. Vikman, Espoo (FI)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 325 days.

(21) Appl. No.: 16/551,078

(22) Filed: Aug. 26, 2019

(65) Prior Publication Data
US 2021/0062864 A1 Mar. 4, 2021

(51) Int. Cl.
| F16C 32/04 | (2006.01) |
| H02K 3/52 | (2006.01) |
| H02K 7/09 | (2006.01) |
| H02K 11/30 | (2016.01) |
| G01D 5/20 | (2006.01) |
| H02K 11/225 | (2016.01) |

(52) U.S. Cl.
CPC ....... *F16C 32/0474* (2013.01); *G01D 5/2046* (2013.01); *H02K 3/524* (2013.01); *H02K 7/09* (2013.01); *H02K 11/225* (2016.01); *H02K 11/30* (2016.01); *H02K 2203/03* (2013.01); *H02K 2203/12* (2013.01)

(58) Field of Classification Search
CPC ........ H02K 3/524; H02K 7/09; H02K 11/225; H02K 11/30; H02K 2203/03; F16C 32/0474; G01D 5/2046

USPC .............. 310/71, 156.51, 216.011, 216.016, 310/216.019, 216.021, 216.059, 216.064
See application file for complete search history.

(56) References Cited

U.S. PATENT DOCUMENTS

| 5,859,486 | A | * | 1/1999 | Nakahara | ............... | H02K 3/524 |
| | | | | | | 310/216.004 |
| 6,121,711 | A | * | 9/2000 | Nakahara | ................. | H02K 1/14 |
| | | | | | | 242/432.3 |
| 6,169,350 | B1 | * | 1/2001 | Yang | ........................ | H02K 1/14 |
| | | | | | | 310/13 |
| 8,772,998 | B2 | * | 7/2014 | Maximov | ............ | H02K 21/225 |
| | | | | | | 310/156.01 |
| 8,901,798 | B2 | * | 12/2014 | Ramu | ...................... | H02K 1/14 |
| | | | | | | 310/46 |
| 2014/0091673 | A1 | * | 4/2014 | Anbarasu | ................. | H02K 3/28 |
| | | | | | | 310/216.109 |
| 2016/0187159 | A1 | * | 6/2016 | Maki-Ontto | ......... | G01D 5/2086 |
| | | | | | | 324/207.15 |

FOREIGN PATENT DOCUMENTS

EP 1252478 B1 12/2012

* cited by examiner

*Primary Examiner* — Rashad H Johnson
(74) *Attorney, Agent, or Firm* — Kevin E. West; Advent, LLP

(57) ABSTRACT

A position sensor includes a plurality of E-shaped ferromagnetic cores arranged to define a circular opening therethrough to receive a shaft. Each E-shaped ferromagnetic core has a plurality of teeth, wherein adjacent E-shaped ferromagnetic cores of the arranged plurality of E-shaped ferromagnetic cores have an overlapping tooth. The position sensor further includes a frame surrounding the arranged plurality of E-shaped ferromagnetic cores, with the E-shaped ferromagnetic cores coupled to the frame.

20 Claims, 9 Drawing Sheets

LOW-COST MODULAR INDUCTIVE POSITION SENSOR AND METHOD OF MANUFACTURING IT

BACKGROUND

Magnetic bearing systems, such as systems having radial and axial magnetic bearings, both active and passive, are used in rotating machines, including electrical machines, such as motors, generators and motor/generators. Position sensors for magnetic bearing systems typically include several separate inductive or eddy-current type proximity sensors. The sensors are placed around the rotor of the magnetic bearing system to radially and axially detect the rotor position by measuring the distance between the rotor and the sensor tip. If the rotor position is measured in five degrees of freedom, then at least five proximity sensors are needed to measure the two radial positions in both ends of the machine and one proximity sensor to measure the axial position of the rotor. However, if a bridge connection (which enables more accurate measurement) between proximity sensors is used, even more sensors are needed, which is also the case if rotor temperature enlargement is detected by axial position measurements.

The sensors are typically quite expensive and mechanical structures also need to be designed to mount the sensors. Moreover, while complete packages that include the sensors and mechanical constructions are also known, the packages are even more expensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some examples are directed to a position sensor. Specifically, the position sensor includes a plurality of E-shaped ferromagnetic cores arranged to define a circular opening therethrough to receive a shaft. Each E-shaped ferromagnetic core has a plurality of teeth, wherein adjacent E-shaped ferromagnetic cores of the arranged plurality of E-shaped ferromagnetic cores have an overlapping tooth. The position sensor further includes a frame surrounding the arranged plurality of E-shaped ferromagnetic cores, with the E-shaped ferromagnetic cores coupled to the frame.

Other examples are directed to a rotating device. Specifically, the rotating device includes a plurality of E-shaped ferromagnetic cores arranged to define a circular opening therethrough to receive a shaft. Each E-shaped ferromagnetic core has a plurality of teeth including a stator tooth, wherein the plurality of E-shaped ferromagnetic cores are stacked to define offset sensing elements. The rotating device also includes a plurality of wound coil bobbins having electromagnetic coils and positioned around each stator tooth, and a frame surrounding the arranged plurality of E-shaped ferromagnetic cores, wherein the E-shaped ferromagnetic cores are coupled to the frame. The rotating device further includes a shaft positioned within the circular opening of the plurality of E-shaped ferromagnetic cores and a power source configured to supply power to the electromagnetic coils. The rotating device additionally includes a control circuit coupled to the electromagnetic coils, wherein the control circuit is configured to receive position signals from the electromagnetic coils and control the power supplied to the electromagnetic coils to cause rotation of the shaft.

Still other examples are directed to a method for manufacturing an inductive type position sensor. Specifically, the method includes arranging a plurality of E-shaped ferromagnetic cores in an offset stacked arrangement and defining a circular opening therethrough to receive a shaft, wherein each E-shaped ferromagnetic core has a plurality of teeth, and adjacent E-shaped ferromagnetic cores of the arranged plurality of E-shaped ferromagnetic cores have an overlapping tooth. The method also includes coupling the plurality of E-shaped ferromagnetic cores to a frame. The method further includes configuring the E-shaped ferromagnetic cores to provide measurement signals used to control rotation of the shaft when inserted within the circular opening of the plurality of E-shaped ferromagnetic cores.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

Figure 1:
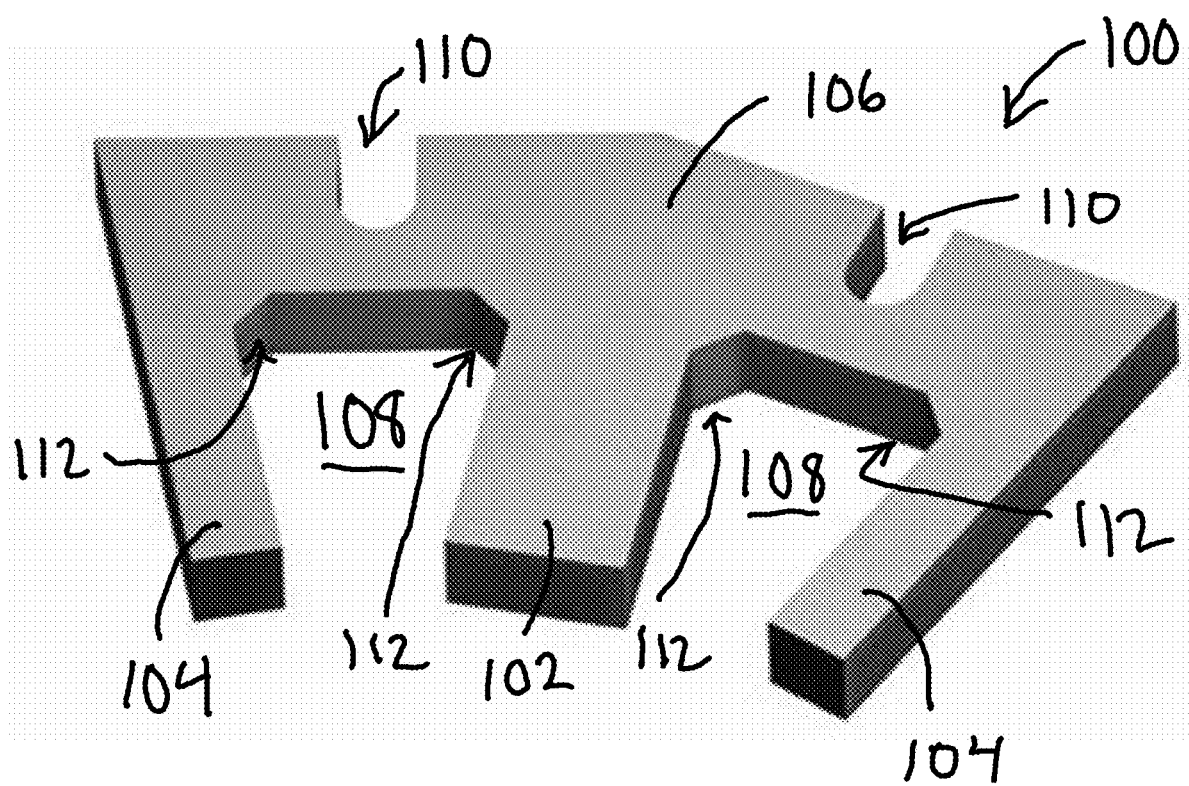
FIG. 1 illustrates an E-shaped core according to an embodiment.

Position sensors described herein, including modular inductive position sensors, are configured to determine sensor information for magnetic bearing systems. For example, one or more positions sensors are formed from a plurality of E-shaped members stacked to surround and provide offset sensing elements as part of the magnetic bearing of the system. The magnetic bearing can be any type of bearing that supports a load using magnetic levitation.

In particular, the position sensor in some configurations includes a frame and a plurality of ferromagnetic E-shaped cores and corresponding windings. A position measurement circuit includes an AC voltage source and windings of the ferromagnetic E-shaped cores, connected to bridge connections, and having output voltages that are linearly dependent of the rotor position in x-, y-, and z-directions (i.e., zero voltage(s) correspond to the (0,0,0) position). The configuration provides a low-cost modular inductive position sensor, in part, by forming a stator core of the sensor by placing identical ferromagnetic E-shaped cores partly on top of each other comprising a full circle. Wound coil bobbins are mounted around each stator tooth and an assembly tool is used to tune the air-gap between the stator core and rotor, which results in a high degree of tuning accuracy. The stator core and coil bobbins of the sensor mounted within the frame, and coils, are supplied from the AC voltage source. The output of each coil is connected to a differential bridge connection from which rotor positions in the x-, y- and z-directions can be measured.

In some configurations, a low-cost modular inductive x,y,z-direction position sensor is used with a high-speed electric motor or other similar apparatus to detect the position of the rotor or some other type of rotating shaft. This position sensor is suitable to be used with magnetic bearing system in some examples because a stable position control of the rotor requires a position measurement feedback. The present disclosure allows for measuring the position of the rotor of a high-speed electric motor with a rotation speed of several kilohertz using non-mechanical contact configurations, particularly using inductive measurements. However, it should be appreciated that the present disclosure can be applied to different non-contactless measuring principles, such as capacitive, eddy current, or optical measuring principles.

The inductive position sensor of various examples is made mechanically rugged and robust, able to thermally sustain high temperatures, and non-volatile to electromagnetic interference (EMI) that can affect position measurements.

In operation, the inductive sensor is used in, for example, a magnetic bearing system to provide position feedback measurement signals for a rotor position controller. That is, position feedback measurement signals are output by the herein described configuration of sensing elements formed from ferromagnetic E-shaped cores, sensor coils wound around suitable plastic coil bobbins and connected into a bridge connection, and the ferromagnetic rotor which is the measured object. The coils are supplied from a high frequency AC-voltage source (e.g., greater than kHz range) that creates an alternating magnetic flux. This magnetic flux flows from the ferromagnetic E-shaped cores through an air-gap to the ferromagnetic rotor and back to ferromagnetic core via another air-gap. If the ferromagnetic parts (E-shaped cores and rotor) are working below a magnetic saturation flux density level, then the rotor position is directly proportional to the size of air-gap between the rotor and ferromagnetic E-shaped cores. That is, rotor movement in one direction increases air-gap on one side and decreases the air-gap from the opposite side, which changes the magnetic circuit inductance and can be detected from the altered bridge connection output voltage.

Specifically, and with reference to FIG. 1, an E-shaped core 100 is formed by laminated electrical steel sheets or using suitable low loss ferrite grades as a core material, which both reduce the amount of eddy currents caused by the alternating magnetic flux inside the ferromagnetic core. It should be noted that other ferromagnetic materials, such solid iron/steel can be used, but high eddy currents are caused by the high frequency of the AC voltage supply of the windings that results from the fast alternating magnetic flux. These eddy currents can cause high losses and skin effects that makes the magnetic flux flow only on the surfaces of the iron parts. Using a ferrite material or laminated steel sheet structure reduces the eddy currents significantly and results in a lower cost of manufacture.

The E-shaped core 100 includes a middle tooth 102 between two side teeth 104 extending from a base 106 that together generally define the E-shape of the E-shaped core 100. In the illustrated example, the middle tooth 102 is wider than each of the side teeth 104, which in one configuration is twice as wide, and each having the same thickness. Additionally, the middle tooth 102 and each of the side teeth 104 have the same length in one example. However, different widths, thickness, and/or lengths are contemplated, such as based on the particular application or configuration of a rotor of a magnetic bearing.

In one example, the side teeth 104 are angled inward toward the middle tooth 102 such that a gap 108 therebetween decreases from a proximal position at the base 106 to a distal position at the ends of the side teeth 104. The amount of angle can be varied as desired or needed. In some examples, the middle tooth 102 and side teeth 104 extend generally perpendicularly from the base 108, which has a curved or arcuate shape. That is, the curvature of the base 108 causes the side teeth 104 to be angled relative to the middle arm 102.

The base 106 further includes slots 110 that are positioned opposite to corresponding gaps 108. The slots 110 are thereby positioned on an opposite side of the base 106 to the gaps 108 and are together define openings to allow selective placement of electromagnetic coil bobbins. That is, bobbins having electromagnetic windings are positioned to allow the flow of electrical current.

Additionally the middle tooth 102 and side teeth 104 are angled at a proximal end to form angled corners 112 within the gap 108. That is, the corners 112 formed at (i) the proximal end of the middle tooth 102 and side teeth 104 and (ii) the base 106 are angled inward such that a non-perpendicular configuration results.

Figure 2:
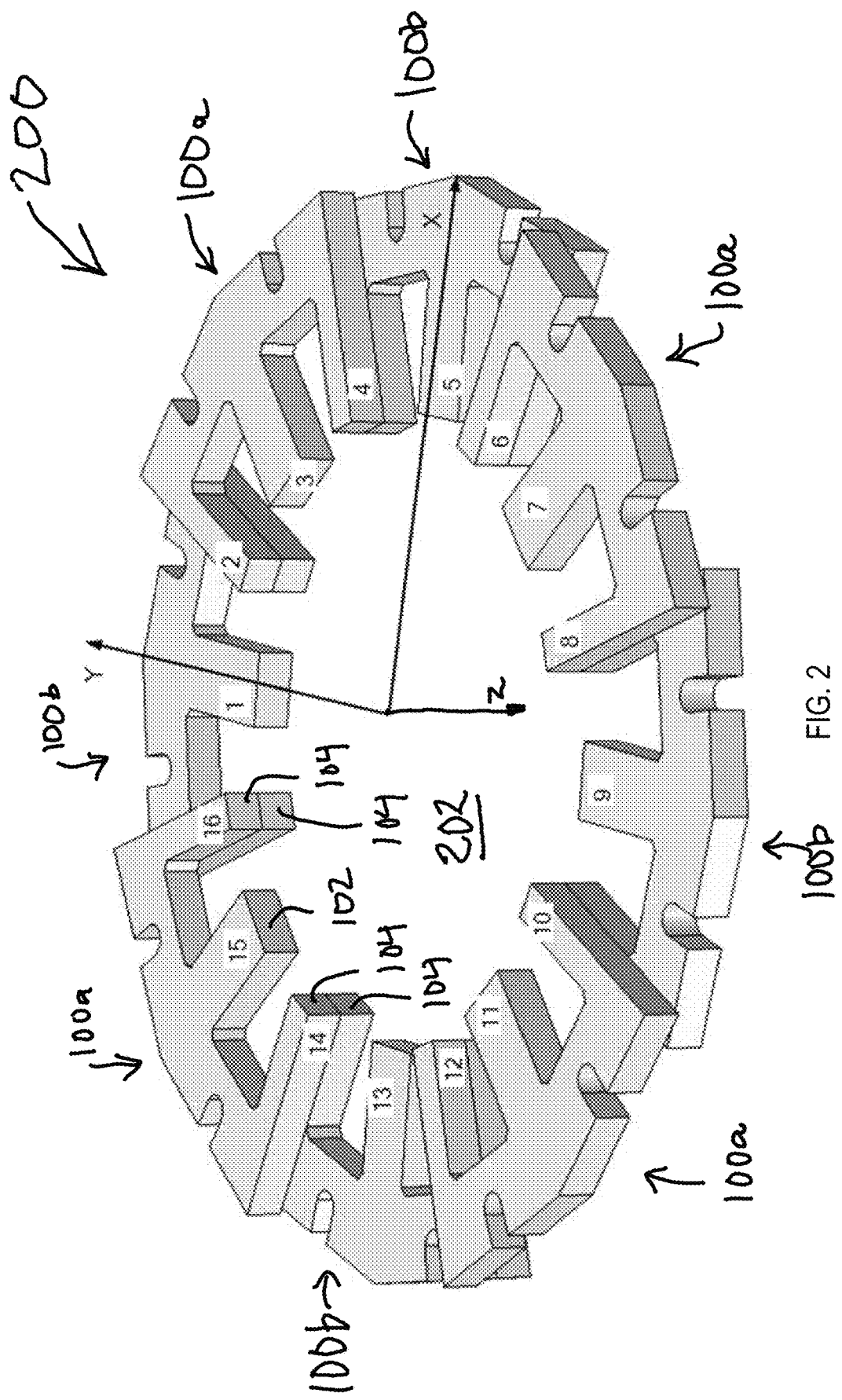
FIG. 2 illustrates a stacked arrangement of E-shaped cores according to an embodiment.

In one example, a plurality of E-shaped cores 100 are configured as a sensor and that define a stator core 200 as illustrated in FIG. 2. In the illustrated configuration, the stator core 200 is formed from eight E-shaped cores 100 in an alternating or offset stacked arrangement. It should be appreciated that fewer or additional E-shaped cores 100 can be used, such as based on the size of each of the E-shaped cores 100 and the overall size (e.g., diameter) of the stator core 200.

More particularly, each of the E-shaped cores 100 define core portions (e.g., ferromagnetic core portions of the stator core 200) and are positioned partially overlapping or on top of an adjacent E-shaped core 100 to define a circular opening 202 therethrough to receive a shaft. The E-shaped cores 100 are arranged to define a continuous circular shape of the stator core 200 wherein part of each E-shaped core 100 (illustrated as an end of each of the E-shaped cores 100) overlaps with part of the E-shaped core 100 on each adjacent side of the E-shaped core 100. In this arrangement, an axial thickness (in the Z-direction) and position of the teeth 102 and 104 of the E-shaped cores 100 (that define the teeth of the stator core 200) vary. In the illustrated example, the thickness of overlapping teeth causes a thickness to double (i.e., abutting teeth of the E-shaped cores 100 doubles the thickness of the thereby defined tooth of the stator core 200). In FIG. 2, the E-shaped cores 100 are arranged in a partial overlapping arrangement such that every second tooth is in an overlapping arrangement and in the middle (i.e., teeth 2, 4, 6, 8, 10, 12, 14, and 16 in FIG. 2), and that are used for radial direction sensing as described in more detail herein. That is, the side teeth 104 of adjacent ones of the E-shaped cores 100 overlap, and the middle teeth 102 do not overlap. In one example, one side tooth 104 of one E-shaped core 100 entirely overlaps one side tooth 104 of the adjacent E-shaped core 100.

In the illustrated example, the E-shaped cores 100 are positioned to overlap in a same axial direction, such that four of the E-shaped cores 100 are positioned along a first x-y plane and the other four of the E-shaped cores 100 are positioned along a second x-y plane parallel to and in abutting arrangement, such that the E-shaped cores 100 in each of the first and second parallel planes contact each other at ends thereof. Thus, as illustrated in FIG. 2, the end portions of the E-shaped cores 100a having the teeth 104 are positioned on top of the end portions of the E-shaped cores 100b having corresponding teeth 104 as viewed in this figure. Thus, in the example of FIG. 2 none of the E-shaped cores 100a are positioned below the E-shaped cores 100b as viewed in this figure. As such, all of the middle teeth 102 of each of the E-shaped cores 100a and the E-shaped cores 100b are positioned within a corresponding x-y plane. That is, every second tooth 104 is displaced axially from the center, such that every fourth tooth to the left side marked with numbers 1, 5, 9, and 13 in FIG. 2 from the center and every fourth tooth to the right side from the center marked as teeth 3, 7, 11, and 15 in FIG. 2, and are used for axial sensing.

FIG. 2 also illustrates one example of selecting a coordinate system in which the +y-direction is between radial teeth 2 and 16 and +x-direction is between radial teeth 4 and 6. It should be appreciated that by modifying the width and/or thickness of the teeth 102 and 104, the magnetic flux density flowing inside the stator teeth through the coils is affected, thereby affecting the voltage induced to the coils and the sensitivity of the sensor.

Figure 3:
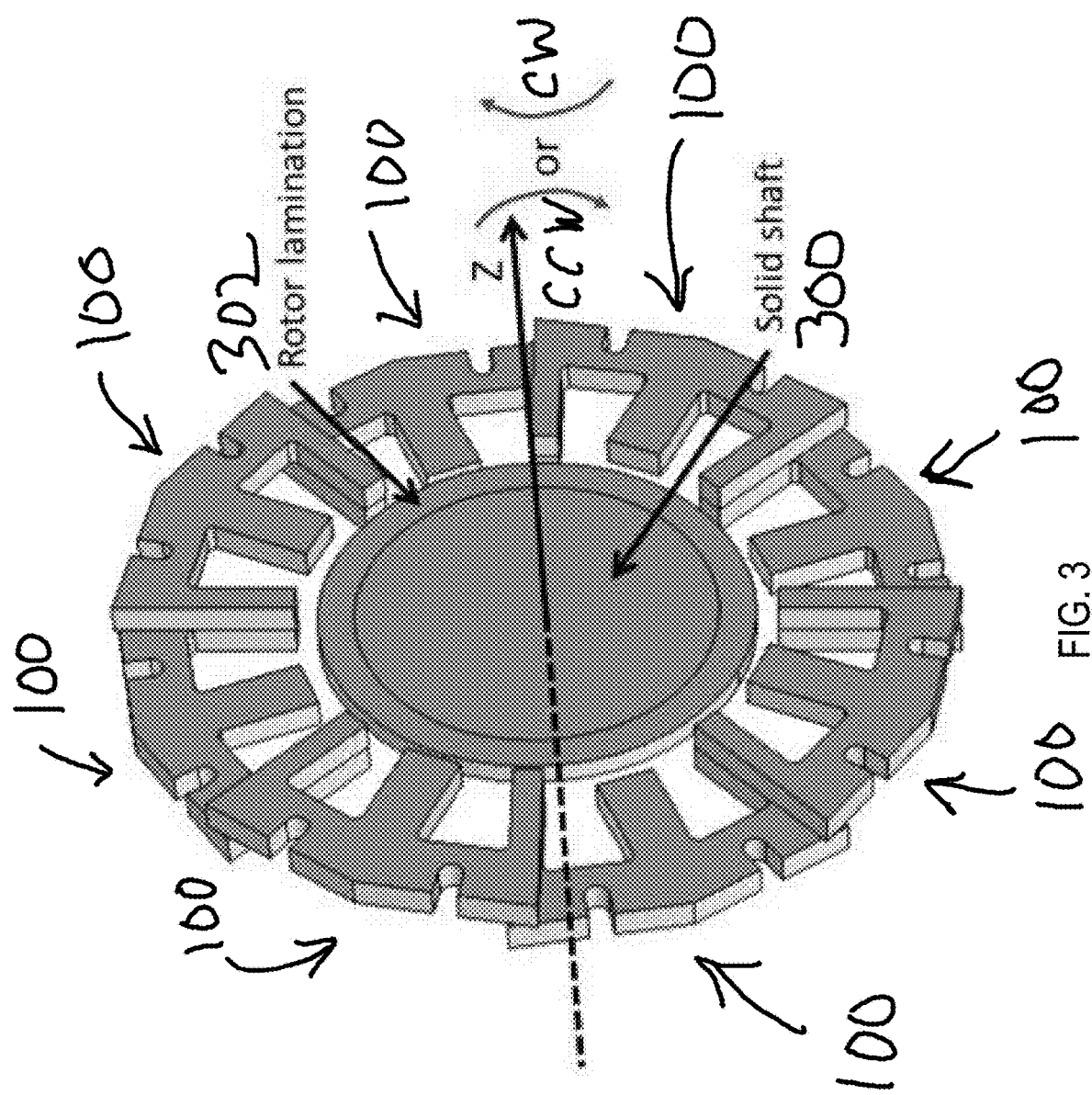
FIG. 3 illustrates the stacked arrangement of FIG. 2 including a rotor.

The stator core 200 is configured to surround a measured object, for example a rotor 300, as illustrated in FIG. 3, which defines a solid shaft. That is, the rotor 300 is positioned within the middle opening of the stator core 200 such that the rotor 300 and the stator core 200 are co-axially positioned. That is, the axial Z-direction is aligned with the rotor 300 and the rotor rotation direction can be either clockwise (CW) or counter-clockwise (CCW) around the z-axis as illustrated by the arrows. It should be noted that in some examples, to facilitate controlling the eddy currents and the problems associated with these current, the rotor 300 includes a laminated steel sheet outer layer 302 inside which magnetic flux can flow with practically zero eddy currents.

It should be noted that due to mechanical limitations, the inner part of the rotor 300 is formed of solid material (e.g. a suitable steel). Additionally, in FIG. 3, only part of the rotor 300 that is associated with the position measurement is shown (i.e., the rotor 300 is longer axially than shown to define a shaft) for ease in illustration.

Figure 4:
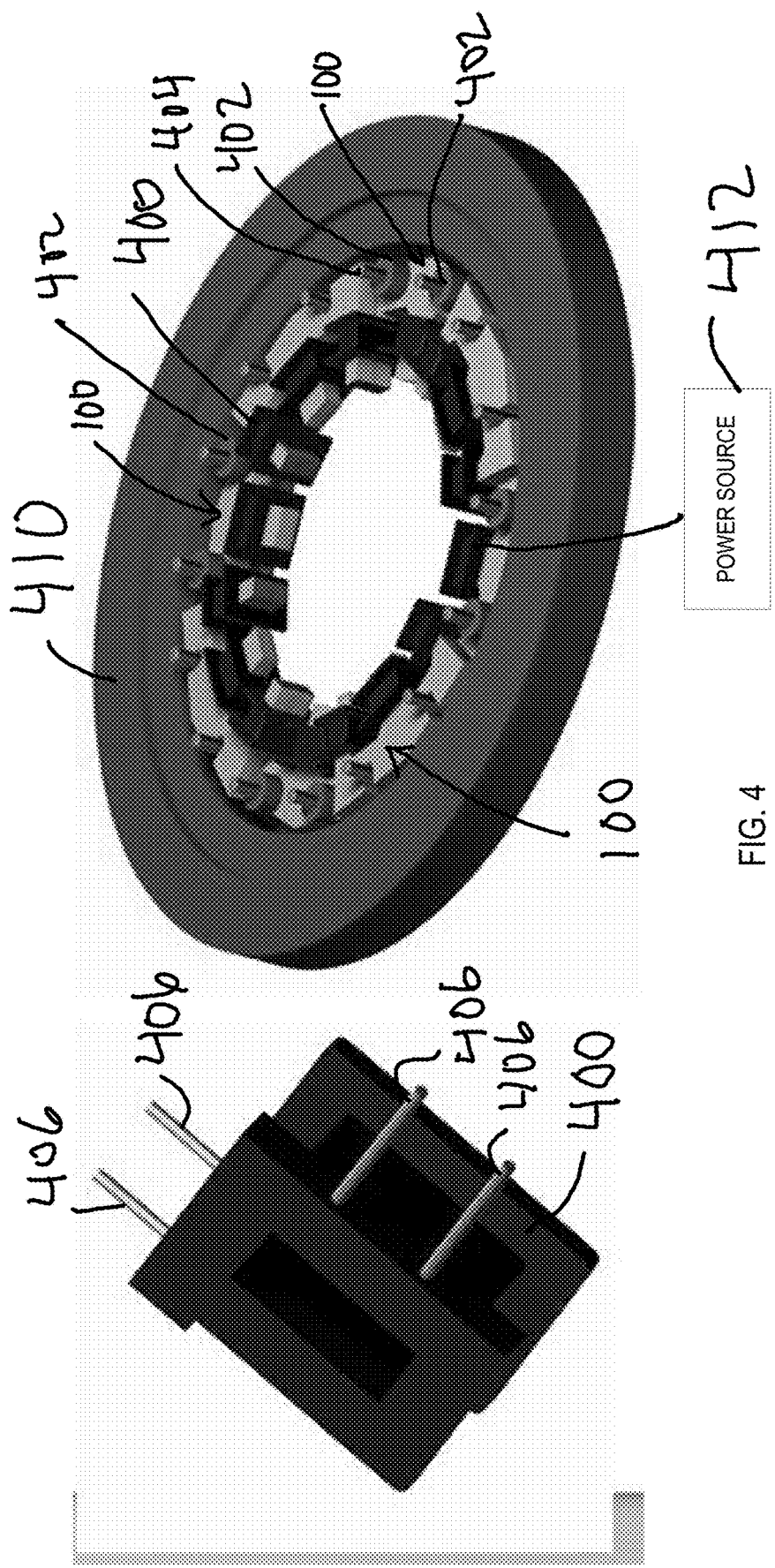
FIG. 4 illustrates a stacked arrangement of E-shaped cores coupled to a frame according to an embodiment.

As illustrated in FIG. 4, wound coil bobbins 400 are placed around (to surround) each stator tooth, including the middle tooth 102 and side teeth 104 of the E-shaped cores 100 and within a frame 410. The bobbins 400 include wire 402 wound around a shaft 404, thereby defining electrical coils. Any suitable coil winding technology is used to form electromagnetic coils 402 from wires surrounding the shafts 404 of the coil bobbins 400. It should be noted that that size and shape of the coil bobbins 400 can be changed, such as based on the particular application, size of the rotor 300, etc. For example, if the cross section of the radial and axial teeth is a square shape (e.g., teeth 102 and 104 as shown in FIG. 1), only one type of coil bobbins 400 are used.

In other configurations, for example, if the width of the radial tooth matches thickness of the axial tooth and vice versa, the same coil bobbins 400 are used and rotated 90 degrees as illustrated in FIG. 4 between radial and axial teeth. In this configuration, the coil bobbins 400 include two connection pins 406 on two sides of the coil bobbins 400 (from which only two connection pins 406 are used and the other two connection pins 406 removed (e.g., cut off) depending on the orientation of the coil bobbin 400 when placed around the teeth 102 and 104 of the E-shaped cores 102). Using only one type of coil bobbins 400 reduces sensor costs, but as should be appreciated, two different types of coil bobbins (e.g., bobbins having different configurations) for radial and axial stator teeth can be used.

In operation, the electromagnetic coils 402 are supplied from a power source 412 (e.g., a high frequency AC voltage source) that generates fast alternating magnetic flux flowing inside the ferromagnetic parts (e.g., E-shaped cores 100) and across the air-gaps between the rotor 300 and stator core 200. Magnetic flux paths are selected by setting the polarity of the electromagnetic coils 402 in a particular way. It should be noted that not all of the electromagnetic coils 402 are used as a supply coils at the same time, in some examples, if the polarity of the electromagnetic coils 402 are configured accordingly. Additionally, by selecting the number of turns in each winding of the electromagnetic coils 402, a suitable flux density level for the magnetic circuit is set. In one configuration, magnetic flux density levels below the saturation flux density limit of the ferromagnetic parts (stator core 200 and rotor 300) are used so that the sensor operation is linearly dependent on the air-gap length between stator core 200 and rotor 300.

Figure 5:
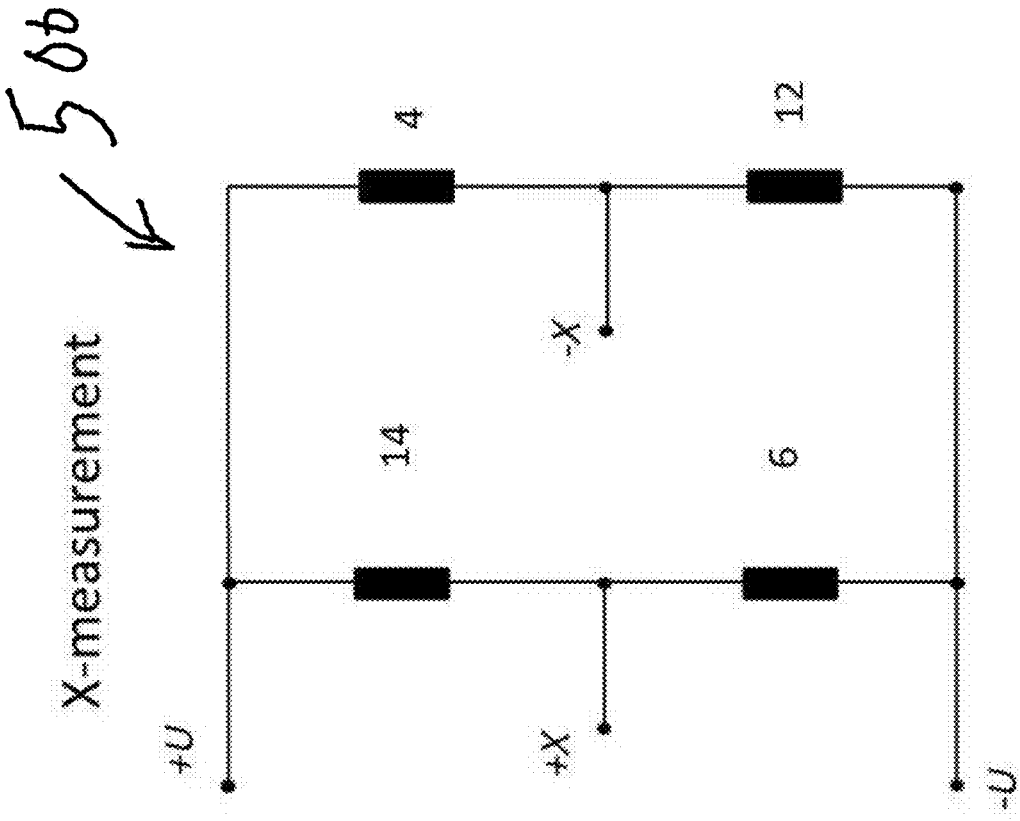
FIG. 5 are schematic diagrams of electrical connection arrangements according to an embodiment.
Figure 5:
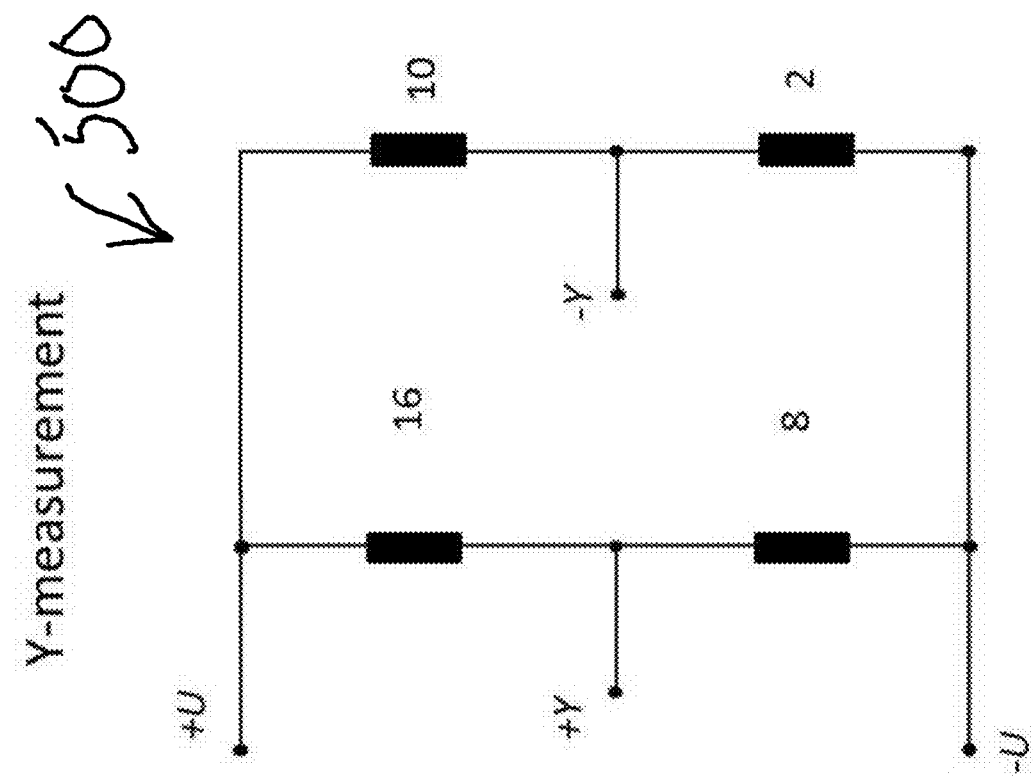
Figure 6:
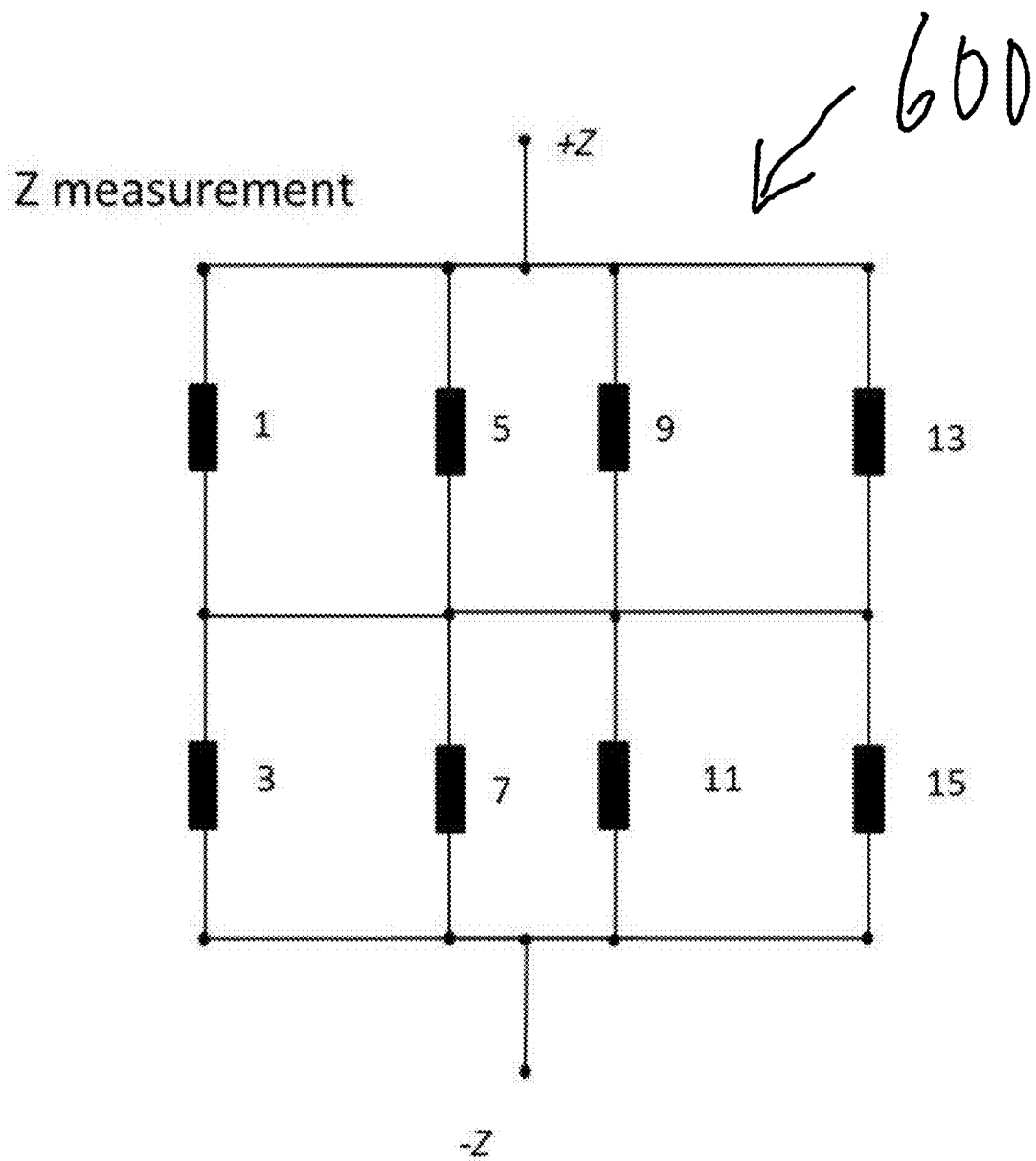
FIG. 6 is a schematic diagram of an electrical connection arrangement according to another embodiment.

In some examples, the outputs of each of the windings of the coil bobbins 400 are connected to form an output bridge connection from which radial direction x and y, as well as axial direction z, measurements are separately made. For example, if the coordinate system x,y, and z is set as shown FIG. 2, the connections as shown in FIGS. 5 and 6 are used to obtain differential output voltages from each coordinate axis. That is, the connection arrangement 500 shown in FIG. 5 is configured to obtain x-direction and y-direction measurements, and the connection arrangement 600 shown in FIG. 6 is configured to obtain z-direction measurements. By connecting the electromagnetic coils 402 as shown in FIGS. 5 and 6, axial coils are solely measurement coils and magnetic flux flowing therethrough is generated with the radial coils. As such, the bridge output voltage is zero if the rotor 300 is exactly in the middle of the stator cores 200 (i.e., all the radial and axial air-gaps are equal to each other). Differential connection improves the resolution of the sensor because, for example, rotor movement in +x direction can be measured as positive voltage in the +x coils and negative voltage in the −x coils. Radial direction movement is compensated from the axial direction measurement in some examples by placing four axial coils (either+coils 1, 5, 9, and 13 or minus coils 3, 7, 11, and 15 as shown in FIG. 2) to have a 90 degrees angle difference.

In some examples, the sensor air-gap is selected to be as small as mechanically possible to reduce the size of the power supply and power consumption of the sensor because most of the magnetic energy is stored in the air-gaps when the ferromagnetic parts are working well below the saturation area. The air-gap in various examples is smaller than 1 millimeter (mm), resulting in the accuracy requirements for the sensor-rotor air-gap to be stringent. For example, a 0.1 mm inaccuracy correspond tens of percent inaccuracy in the air-gap, which is directly proportional to the inductance of the electromagnetic coils 402. In one example, accurate machining tools are used to produce the ferromagnetic E-shaped cores 100 as described herein.

In another example, a specific assembly tool inside the sensor is used in the assembly process as described herein. After the sensor cores are assembled to form a continuous circle, the sensor cores are mounted inside a frame (e.g., the frame 410 formed from aluminum as shown in FIG. 4) so that sensor cores are not securely attached to the frame 410. In this example, the E-shaped cores 100 are mounted to the frame 410 using connection screws 704 (shown in FIG. 7), which is also a cost saving method compared with gluing or shrink fitting. Using connection screws also increases the assembly speed compared to other conventional methods.

Figure 7:
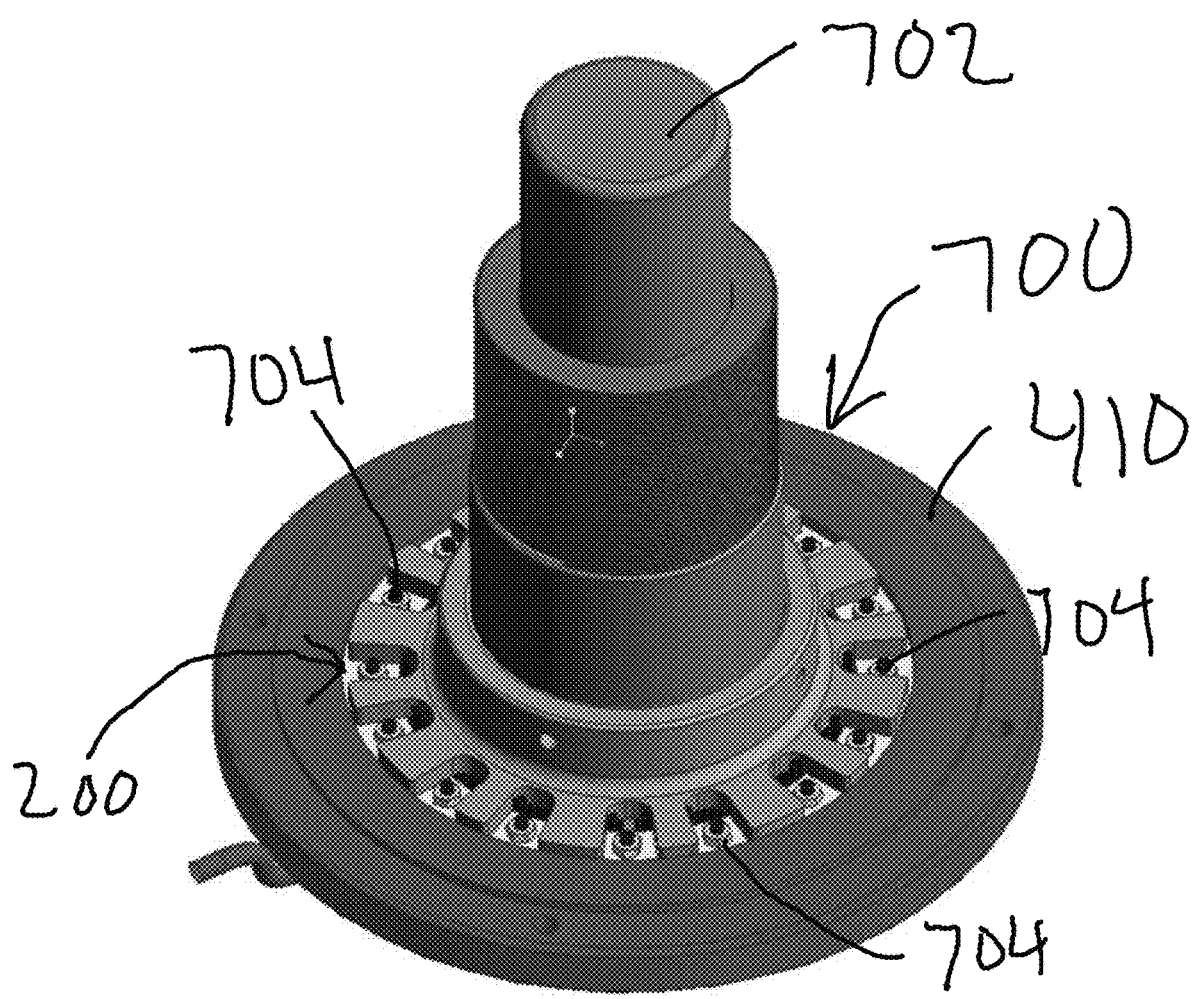
FIG. 7 illustrates a stacked arrangement of E-shaped cores coupled to a frame with a shaft inserted therethrough according to an embodiment.
Figure 8:
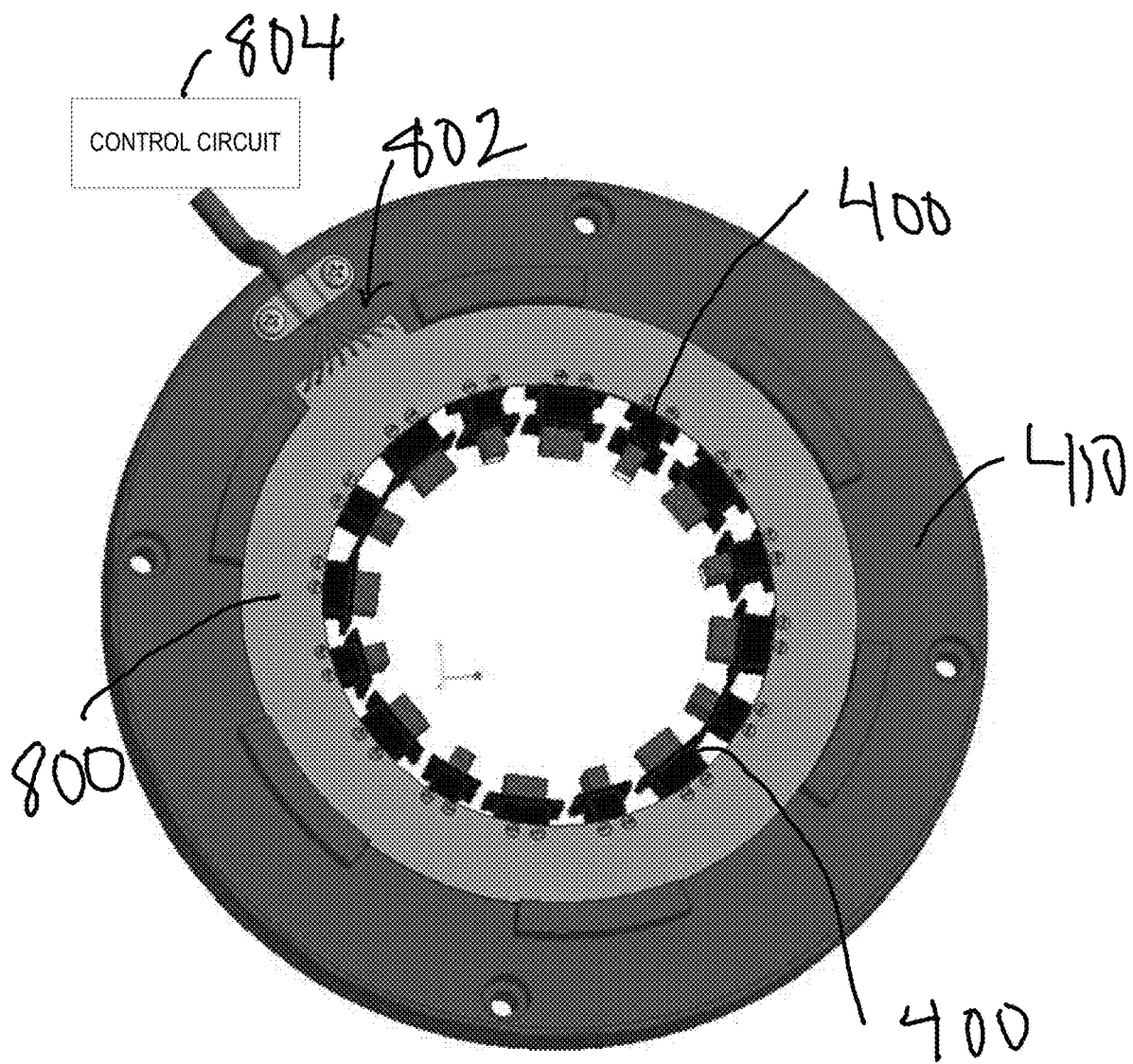
FIG. 8 illustrates a stacked arrangement of E-shaped cores coupled to a frame and having a printed circuit board connection according to an embodiment.

A sensor 700 is illustrated in FIG. 7, wherein a shaft 702 (e.g., a precision machined shaft) is positioned (e.g., pushed) inside the sensor 700 and powered so that the sensor 700 acts as an electromagnet pulling the E-shaped cores 100 (formed of a ferrite material) towards the shaft 702 so that air-gaps around the circular configuration are uniform and as small as possible. Thereafter, the mounting screws 704 of the E-shaped cores 100 are tightened and the assembly tool power is powered off and removed from the stator core 200. Then, the plastic and wound coil bobbins 400 are attached to each stator core tooth (i.e., the teeth 102 and 104) and the electromagnetic coils 402 are connected to form the connection arrangement shown in FIGS. 5 and 6. In one example, this connection arrangement is performed by using a printed circuit board 800 as shown in FIG. 8 to reduce the amount of space used and to provide a robust design. The printed circuit board 800 is connected to a control circuit 804 via electrical wires 802.

The control circuit 804 is configured to control the supply of electrical power to the electromagnetic coils 402, via the electrical wires 802, to drive rotation of the rotor 300 about the axis thereof. For example, when electrical power is selectively supplied to one of the electromagnetic coils 402 (configured as stator winding) via one of the electrical wires 802, the resulting current in the stator winding generates a magnetic field that couples to the rotor 300. The magnetic field associated with the magnetic material in the rotor 300 (within the E-shaped cores 100) attempts to align with the magnetic field generated by the stator core 200, resulting in rotational movement of the rotor 300. The control circuit 804 is some examples sequentially activates the stator windings so that the E-shaped cores 100 (magnet elements) of the rotor 300 continuously "chase" the advancing magnetic field generated by the stator windings.

The present disclosure provides a position sensor that can provide a signal to the control circuit 804 that is indicative of a current position of the rotor 300 (relative to the stator core 200) using the E-shaped cores 100. The control circuit 804 is configured to utilize this signal when sequentially activating the stator windings to maintain proper timing of a commutation sequence.

Thus, various examples provide a sensor design that is modular. That is, designing position sensors for different sizes of rotors involves only the scaling of the size of the individual parts (E-cores, coil bobbins, frame and optionally the printed circuit board for connections). That is, an inductive position sensor is configured to measure the position of the shaft of a magnetic bearing without the use of a cogged ring. The present disclosure uses E-shaped ferrite cores and the corresponding windings to provide the measurements.

That is, the E-shaped ferrite cores are arranged around the shaft as disclosed herein to form an inductive type position sensor.

Figure 9:
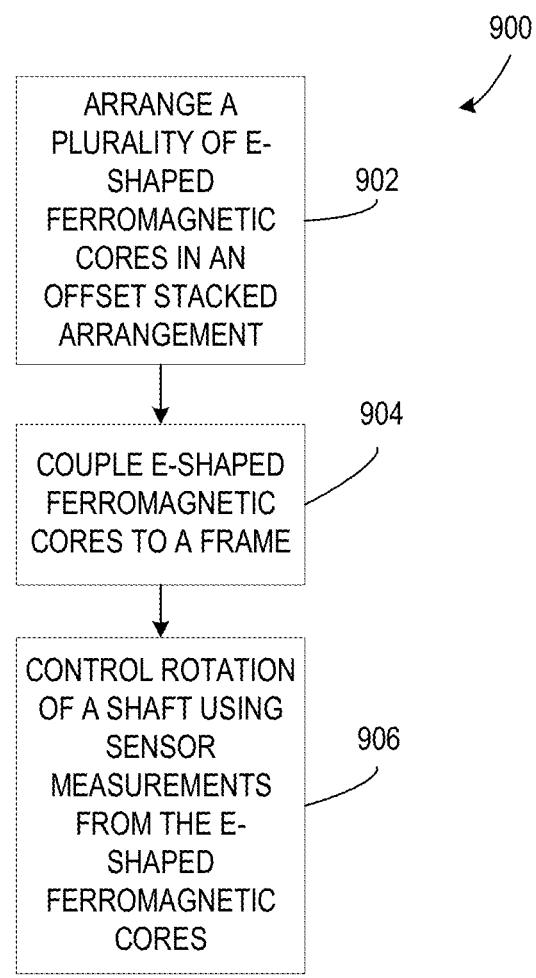
FIG. 9 illustrates a flow chart of a method for manufacturing a sensor device according to an embodiment.

FIG. 9 illustrates a flow chart of a method 900 for manufacturing a sensor device, such as an inductive type position sensor for determining the position of the shaft within a magnetic bearing. The method 900 is easily scalable to different sizes of shafts and magnetic bearings.

More particularly, and with reference also to FIGS. 1-8, the method 900 includes at 902 arranging a plurality of E-shaped ferromagnetic cores (e.g., the E-shaped cores 100) in a offset stacked arrangement as described herein. For example, the E-shaped ferromagnetic cores are arranged in a circle to define a shaft opening wherein adjacent E-shaped ferromagnetic cores have one or more overlapping teeth.

The method includes coupling the E-shaped ferromagnetic cores to a frame at 904. For example, the E-shaped ferromagnetic cores are coupled within a frame (e.g., the frame 410) to define a stator core through which a shaft can be inserted. In one example, a shaft (rotor) is interested within the arranged E-shaped ferromagnetic cores, which are then energized. The E-shaped ferromagnetic cores are then coupled to the frame in the energized state.

The method 900 further includes at 906 configuring the E-shaped ferromagnetic cores to provide measurement signals used to control rotation of the shaft. For example, in operation with the manufactured sensor device, a control circuit (e.g., the control circuit 804) receives position signals from the E-shaped ferromagnetic cores and uses the signals to control the energization of electromagnetic coils (e.g., the electromagnetic coils 402) of the stator (e.g., the stator core 200 formed in part by the E-shaped ferromagnetic cores) to control rotation of the shaft.

Thus, in various examples, identically shaped ferromagnetic E-shaped cores can be manufactured from laminated electrical steel sheets or suitable ferrite material, which are both inexpensive and easy to manufacture. The herein described design is also modular, such that sensors for measuring different sizes of rotor can be provided by scaling the size of E-shaped cores, as well as the coil bobbins and frame part (i.e., making the E-shaped cores larger or smaller). The position measurement circuit in one example includes an AC voltage source and windings of the ferromagnetic E-shaped cores wound around plastic coil bobbins and connected to bridge connections having output voltages that are linearly dependent of the rotor position in x-, y-, and z-directions. Winding connections between coil-bobbins in one example are implemented with printed circuit boards.

Exemplary Operating Environment

The present disclosure is operable with any electrical machine having a magnetic bearing. The control of the electrical machine is accomplished in some examples using a computing apparatus. In one example, components of the computing apparatus may be implemented as a part of an electronic device according to one or more embodiments described in this specification. The computing apparatus comprises one or more processors which may be microprocessors, controllers or any other suitable type of processors for processing computer executable instructions to control the operation of the electronic device. Platform software comprising an operating system or any other suitable platform software may be provided on the apparatus to enable application software to be executed on the device. According to an embodiment, anomaly detection may be accomplished by software.

Computer executable instructions may be provided using any computer-readable media that are accessible by the computing apparatus. Computer-readable media may include, for example, computer storage media such as a memory and communications media. Computer storage media, such as the memory, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory) is shown within the computing apparatus, it will be appreciated by a person skilled in the art, that the storage may be distributed or located remotely and accessed via a network or other communication link (e.g. using a communication interface).

The computing apparatus may comprise an input/output controller configured to output information to one or more input devices and output devices, for example a display or a speaker, which may be separate from or integral to the electronic device. The input/output controller may also be configured to receive and process an input from the one or more input devices, for example, a keyboard, a microphone or a touchpad. In one embodiment, the output device may also act as the input device. An example of such a device may be a touch sensitive display. The input/output controller may also output data to devices other than the output device, e.g. a locally connected printing device. In some embodiments, a user may provide input to the input device(s) and/or receive output from the output device(s).

The functionality described herein, such as the control functionality, can be performed, at least in part, by one or more hardware logic components. According to an example, the computing apparatus is configured by the program code when executed by the processor(s) to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary system, examples of the disclosure are capable of implementation with numerous other systems, including using general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The examples and embodiments illustrated and described herein as well as examples and embodiments not specifically described herein but within the scope of aspects of the claims constitute exemplary means for position sensing.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

ADDITIONAL EXAMPLES

Some examples are directed to a position sensor. Such examples specifically include: a plurality of E-shaped ferromagnetic cores arranged to define a circular opening therethrough to receive a shaft, each E-shaped ferromagnetic core having a plurality of teeth, wherein adjacent E-shaped ferromagnetic cores of the arranged plurality of E-shaped ferromagnetic cores have an overlapping tooth; and a frame surrounding the arranged plurality of E-shaped ferromagnetic cores, the E-shaped ferromagnetic cores coupled to the frame.

In some examples, the plurality of E-shaped ferromagnetic cores are configured as a stator to receive therein the shaft configured as the rotor.

In some examples, each E-shaped ferromagnetic core of the plurality of E-shaped ferromagnetic cores comprises a middle tooth and two side teeth, one each on an opposite side of the middle tooth, the middle tooth and two side teeth extending from a base to form an E-shaped profile.

In some examples, the middle tooth had a first width and each of the two side teeth have a second width, wherein the first width is twice the second width.

In some examples a side tooth of one E-shaped ferromagnetic core entirely overlaps a side tooth of an adjacent E-shaped ferromagnetic core.

In some examples, a first set of the plurality of E-shaped ferromagnetic cores are arranged in a first plane and a second set of the plurality of E-shaped ferromagnetic cores are arranged in a second plane, the first and second planes being parallel.

In some examples, coil bobbins have electromagnetic coils arranged relative to the plurality of plurality of E-shaped ferromagnetic cores, and a control circuit is coupled to the electromagnetic coils, the control circuit is configured to receive position signals from the electromagnetic coils and control power supplied to the electromagnetic coils.

In some examples, a printed circuit board forms a connection arrangement between the coil bobbins and the control circuit.

In some examples, outputs of each of the electromagnetic coils of the coil bobbins are connected to form an output bridge connection, and the control circuit is configured to obtain separate radial direction x and y measurements and axial direction z measurements from the output bridge connection.

Other examples are directed to a rotating device. Specifically, the rotating device includes: a plurality of E-shaped ferromagnetic cores arranged to define a circular opening therethrough to receive a shaft, each E-shaped ferromagnetic core having a plurality of teeth including a stator tooth, the plurality of E-shaped ferromagnetic cores stacked to define offset sensing elements; a plurality of wound coil bobbins having electromagnetic coils and positioned around each stator tooth; a frame surrounding the arranged plurality of E-shaped ferromagnetic cores, the E-shaped ferromagnetic cores coupled to the frame; a shaft positioned within the circular opening of the plurality of E-shaped ferromagnetic cores; a power source configured to supply power to the electromagnetic coils; and a control circuit coupled to the electromagnetic coils, the control circuit configured to receive position signals from the electromagnetic coils and control the power supplied to the electromagnetic coils to cause rotation of the shaft.

In some examples, the plurality of E-shaped ferromagnetic cores are configured as a stator to receive therein the shaft configured as the rotor and having a laminated steel sheet outer layer.

In some examples, each E-shaped ferromagnetic core of the plurality of E-shaped ferromagnetic cores comprises a middle tooth and two side teeth with one of each side tooth on an opposite side of the middle tooth, the middle tooth and two side teeth extending from a base to form an E-shaped profile.

In some examples, the middle tooth had a first width and each of the two side teeth have a second width, wherein the first width is twice the second width.

In some examples, a side tooth of one E-shaped ferromagnetic core entirely overlaps a side tooth of an adjacent E-shaped ferromagnetic core.

In some examples, a first set of the plurality of E-shaped ferromagnetic cores are arranged in a first plane and a second set of the plurality of E-shaped ferromagnetic cores are arranged in a second plane, the first and second planes being parallel to define the offset sensing elements.

In some examples, a printed circuit board forms a connection arrangement between the plurality of wound coil bobbins and the control circuit.

In some examples, outputs of each of the electromagnetic coils of the plurality of wound coil bobbins are connected to form an output bridge connection, and the control circuit is configured to obtain separate radial direction x and y measurements and axial direction z measurements from the output bridge connection.

Other examples are directed to a method for manufacturing an inductive type position sensor. Specifically, the method includes arranging a plurality of E-shaped ferromagnetic cores in an offset stacked arrangement and defining a circular opening therethrough to receive a shaft, each E-shaped ferromagnetic core having a plurality of teeth, wherein adjacent E-shaped ferromagnetic cores of the arranged plurality of E-shaped ferromagnetic cores have an overlapping tooth; coupling the plurality of E-shaped ferromagnetic cores to a frame; and configuring the E-shaped ferromagnetic cores to provide measurement signals used to control rotation of the shaft when inserted within the circular opening of the plurality of E-shaped ferromagnetic cores.

In some examples, the method includes configuring a control circuit to obtain separate radial direction x and y measurements and axial direction z measurements from an output bridge connection connected to wound coil bobbins positioned around the plurality of teeth.

In some examples, the method includes coupling the plurality of E-shaped ferromagnetic cores to the frame in an energized state of the plurality of E-shaped ferromagnetic cores.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A position sensor for positioning a shaft of an electrical motor, the position sensor comprising:
 a plurality of E-shaped ferromagnetic cores arranged to define a circular opening therethrough to receive a shaft, each E-shaped ferromagnetic core having at least a middle tooth, a first side tooth, and a second side tooth, the second side tooth of each E-shaped ferromagnetic core at least partially overlapping the first side tooth of an adjacent E-shaped ferromagnetic core of the arranged plurality of E-shaped ferromagnetic cores and thereby defining a set of overlapping side teeth;
a first plurality of wound coil bobbins having electromagnetic coils, each wound coil bobbin positioned around a respective set of overlapping side teeth;
a second plurality of wound coil bobbins having electromagnetic coils, each wound coil bobbin positioned around a respective middle tooth;
a power source configured to supply power to the electromagnetic coils of the first plurality of wound coil bobbins; and
a control circuit coupled to the electromagnetic coils of the first plurality of wound core bobbins and the second plurality of wound coil bobbins, the control circuit configured to receive position signals from the electromagnetic coils and control the power supplied to the electromagnetic coils of the first plurality of wound coil bobbins to cause rotation of the shaft based on the received position signals.

2. The position sensor of claim 1, wherein the plurality of E-shaped ferromagnetic cores are configured as a stator and the shaft configured as a rotor.

3. The position sensor of claim 1, wherein the middle tooth of each E-shaped ferromagnetic core has a first width, and the first side tooth and the second side tooth of each E-shaped ferromagnet core each have a second width, the first width being approximately twice the second width.

4. The position sensor of claim 1, wherein the second side tooth of each E-shaped ferromagnetic core entirely overlaps the first side tooth of the adjacent E-shaped ferromagnetic core.

5. The position sensor of claim 1, further comprising a printed circuit board forming a connection arrangement between the first and second pluralities of wound coil bobbins and the control circuit.

6. The position sensor of claim 1, wherein a corresponding set of outputs of each of the electromagnetic coils of the first and second pluralities of wound coil bobbins are connected to form an output bridge connection, the control circuit configured to obtain separate radial direction x and y measurements and axial direction z measurements from the output bridge connection.

7. The position sensor of claim 1, further comprising a frame surrounding the plurality of E-shaped ferromagnetic cores, the E-shaped ferromagnetic cores coupled to the frame.

8. A position sensor for positioning a shaft of an electrical motor, the position sensor comprising:
a plurality of E-shaped ferromagnetic cores arranged to define a circular opening therethrough to receive a shaft, each E-shaped ferromagnetic core having at least a middle tooth, a first side tooth, and a second side tooth, the second side tooth of each E-shaped ferromagnetic core at least partially overlapping the first side tooth of an adjacent E-shaped ferromagnetic core of the arranged plurality of E-shaped ferromagnetic cores and thereby defining a set of overlapping side teeth, wherein a first set of the plurality of E-shaped ferromagnetic cores are arranged in a first plane and a second set of the plurality of E-shaped ferromagnetic cores are arranged in a second plane, the first and second planes being parallel to define a z-axis offset;
a first plurality of wound coil bobbins having electromagnetic coils, each wound coil bobbin positioned around a respective set of overlapping side teeth, wherein a first set of opposing electromagnetic coils of the first plurality of wound coil bobbins define an x-axis offset and a second set of opposing electromagnetic coils of the first plurality of wound coil bobbins define a y-axis offset;
a second plurality of wound coil bobbins having electromagnetic coils, each wound coil bobbin positioned around each respective middle tooth;
a power source configured to supply power to the electromagnetic coils of the first plurality of wound coil bobbins; and
a control circuit coupled to the electromagnetic coils of the first and second pluralities of wound coil bobbins, the control circuit configured to receive position signals corresponding to a relative position of the x-, y-, and z-axis offsets, and control the power supplied to the electromagnetic coils of the first plurality to cause rotation of the shaft based on the received position signals.

9. The position sensor of claim 8, wherein the plurality of E-shaped ferromagnetic cores are configured as a stator and the shaft configured as a rotor.

10. The position sensor of claim 8, wherein the middle tooth of each E-shaped ferromagnetic core has a first width, and the first side tooth and the second side tooth of each E-shaped ferromagnet core each have a second width, the first width being approximately twice the second width.

11. The position sensor of claim 8, wherein the second side tooth of each E-shaped ferromagnetic core entirely overlaps the first side tooth of the adjacent E-shaped ferromagnetic core.

12. The position sensor of claim 8, further comprising a printed circuit board forming a connection arrangement between the first and second pluralities of wound coil bobbins and the control circuit.

13. The position sensor of claim 8, wherein a corresponding set of outputs of each of the electromagnetic coils of the first and second pluralities of wound coil bobbins are connected to form an output bridge connection, the control circuit configured to obtain separate radial direction x and y measurements and axial direction z measurements from the output bridge connection.

14. The position sensor of claim 8, further comprising a frame surrounding the plurality of E-shaped ferromagnetic cores, the E-shaped ferromagnetic cores coupled to the frame.

15. A rotating device having a sensor for positioning a rotatable shaft, the rotating device comprising:
a plurality of E-shaped ferromagnetic cores arranged to define a circular opening therethrough to receive a shaft, each E-shaped ferromagnetic core having at least a middle tooth, a first side tooth, and a second side tooth, the second side tooth of each E-shaped ferromagnetic core at least partially overlapping the first side tooth of an adjacent E-shaped ferromagnetic core of the arranged plurality of E-shaped ferromagnetic cores and thereby defining a set of overlapping side teeth;
a frame surrounding the plurality of E-shaped ferromagnetic cores, the E-shaped ferromagnetic cores coupled to the frame, the frame and the coupled E-shaped ferromagnetic cores defining a stator;
a first plurality of wound coil bobbins having electromagnetic coils, each wound coil bobbin positioned around each respective set of overlapping side teeth;
a second plurality of wound coil bobbins having electromagnetic coils, each wound coil bobbin positioned around each respective middle tooth;

a shaft positioned within the circular opening of the plurality of E-shaped ferromagnetic cores, the shaft configured as a rotor such that the shaft is permitted to rotate within the circular opening along a longitudinal axis passing through the circular opening;

a power source configured to supply power to the electromagnetic coils of the first plurality of wound coil bobbins; and a control circuit coupled to the electromagnetic coils of the first and second pluralities of wound coil bobbins, the control circuit configured to receive position signals from the electromagnetic coils and control the power supplied to the electromagnetic coils of the first plurality to cause rotation of the shaft based on the received position signals.

16. The position sensor of claim 15, wherein the middle tooth of each E-shaped ferromagnetic core has a first width, and the first side tooth and the second side tooth of each E-shaped ferromagnet core each have a second width, the first width being approximately twice the second width.

17. The position sensor of claim 15, wherein the second side tooth of each E-shaped ferromagnetic core entirely overlaps the first side tooth of the adjacent E-shaped ferromagnetic core.

18. The position sensor of claim 15, further comprising a printed circuit board forming a connection arrangement between the first and second pluralities of wound coil bobbins and the control circuit.

19. The position sensor of claim 15, wherein a corresponding set of outputs of each of the electromagnetic coils of the first and second pluralities of wound coil bobbins are connected to form an output bridge connection, the control circuit configured to obtain separate radial direction x and y measurements and axial direction z measurements from the output bridge connection.

20. The position sensor of claim 15, wherein the E-shape ferromagnetic cores are comprised of laminate electrical steel sheets.

* * * * *